United States Patent
Bléger et al.

(10) Patent No.: US 12,173,111 B2
(45) Date of Patent: Dec. 24, 2024

(54) COMPOSITION COMPRISING POLYESTERS FOR ADDITIVE MANUFACTURING

(71) Applicant: Evonik Operations GmbH, Essen (DE)

(72) Inventors: David Bléger, Düsseldorf (DE); Peter Altenbuchner, Münster (DE); Emmanouil Spyrou, Schermbeck (DE); Thomas Pastor, Dülmen (DE); Marie-Theres Wilkes, Dorsten (DE); Odo Wunnicke, Münster (DE); Benjamin Willy, Düsseldorf (DE); Maik Dimmerling, Oer-Erkenschwick (DE); Kim Bühning, Herten (DE); Christiane Zatocil, Herten (DE); Elke Gollan, Herne (DE)

(73) Assignee: Evonik Operations GmbH, Essen (DE)

(*) Notice: Subject to any disclaimer, the term of this patent is extended or adjusted under 35 U.S.C. 154(b) by 209 days.

(21) Appl. No.: 17/776,904

(22) PCT Filed: Dec. 4, 2020

(86) PCT No.: PCT/EP2020/084655
§ 371 (c)(1),
(2) Date: May 13, 2022

(87) PCT Pub. No.: WO2021/122058
PCT Pub. Date: Jun. 24, 2021

(65) Prior Publication Data
US 2022/0403093 A1 Dec. 22, 2022

(30) Foreign Application Priority Data
Dec. 17, 2019 (EP) .................................... 19216942

(51) Int. Cl.
| | |
|---|---|
| *C08G 18/00* | (2006.01) |
| *B29C 64/124* | (2017.01) |
| *B33Y 70/00* | (2020.01) |
| *C08G 18/24* | (2006.01) |
| *C08G 18/42* | (2006.01) |
| *C08G 18/75* | (2006.01) |
| *C08G 18/81* | (2006.01) |
| *C08K 3/36* | (2006.01) |
| *C08K 9/06* | (2006.01) |
| *B33Y 10/00* | (2015.01) |

(52) U.S. Cl.
CPC .......... *C08G 18/4233* (2013.01); *B33Y 70/00* (2014.12); *C08G 18/246* (2013.01); *C08G 18/755* (2013.01); *C08G 18/8175* (2013.01); *C08K 3/36* (2013.01); *C08K 9/06* (2013.01); *B29C 64/124* (2017.08); *B33Y 10/00* (2014.12)

(58) Field of Classification Search
None
See application file for complete search history.

(56) References Cited

U.S. PATENT DOCUMENTS

| | | | |
|---|---|---|---|
| 3,213,058 A | | 10/1965 | Boyle et al. |
| 5,151,454 A | * | 9/1992 | Goto ...................... C08L 75/04 528/65 |
| 5,178,952 A | * | 1/1993 | Yamamoto ........... C08G 18/673 525/450 |
| 6,916,867 B2 | | 7/2005 | Gugumus |
| 7,157,586 B2 | | 1/2007 | Wood et al. |
| 7,695,643 B2 | | 4/2010 | Fritzsche et al. |
| 8,729,259 B2 | | 5/2014 | Spyrou et al. |
| 9,453,142 B2 | | 9/2016 | Rolland et al. |
| 9,738,034 B2 | | 8/2017 | Gruber et al. |
| 10,351,687 B2 | * | 7/2019 | Diendorf ................ C08G 18/14 |
| 10,688,718 B2 | | 6/2020 | Wieber et al. |
| 10,695,978 B2 | | 6/2020 | Poppe et al. |
| 10,737,439 B2 | | 8/2020 | Ebert et al. |
| 10,793,664 B2 | | 10/2020 | Lomölder et al. |

(Continued)

FOREIGN PATENT DOCUMENTS

| | | | | |
|---|---|---|---|---|
| CN | 108 727 550 A1 | 11/2018 | | |
| WO | WO-2008125202 A1 | * | 10/2008 | ............. C08G 18/42 |

(Continued)

OTHER PUBLICATIONS

Nordmann, New Visiomer® Tmchma monomer from Evonik, Dec. 15, 2020, https://www.nordmann.global/en/news-events/news/new-visiomer-r-tmchma-monomer-from-evonik (Year: 2020).*
International Search Report mailed on Feb. 25, 2021 in PCT/EP2020/084655 (4 pages).
Kolb et al., U.S. Appl. No. 17/611,160, filed Nov. 14, 2021.
Swetly et al., "Capabilities of additive manufacturing technologies (AMT) in the validation of the automotive cockpit," RTejournal—Forum for Rapid Technology 2014 (1) (10 pages).
Written Opinion mailed on Feb. 25, 2021 in PCT/EP2020/084655 (5 pages).

*Primary Examiner* — Timothy Kennedy
(74) *Attorney, Agent, or Firm* — Michael Best & Friedrich LLP

(57) ABSTRACT

The present invention relates to an additive manufacturing process using a composition comprising the reaction product of a polyester polyol and a compound comprising at least one functional group that can react with a hydroxyl-group of the polyester polyol and at least one further functional group, selected from acrylate-or methacrylate-group, wherein the polyester polyol is based on at least one organic acid comprising at least two carboxyl groups or its anhydride and at least one polyol comprising at least two hydroxy-groups, wherein the reaction product has a glass transition temperature Tg of below 23° C., wherein the composition optionally further comprises a photoinitiator, as a photopolymerizable material in.

19 Claims, No Drawings

(56) References Cited

U.S. PATENT DOCUMENTS

| | | |
|---|---|---|
| 10,793,731 B2 | 10/2020 | Bernhardt et al. |
| 11,286,335 B2 | 3/2022 | Spyrou et al. |
| 11,326,017 B2 | 5/2022 | Unkelhäuser et al. |
| 2005/0084123 A1 | 4/2005 | Litke et al. |
| 2007/0059637 A1* | 3/2007 | Namba .................. G03F 7/033 430/270.1 |
| 2014/0239527 A1* | 8/2014 | Lee ....................... B29C 64/106 264/17 |
| 2016/0280977 A1* | 9/2016 | Chen .................. C08G 18/4202 |
| 2016/0288412 A1 | 10/2016 | Stampfl et al. |
| 2017/0355807 A1 | 12/2017 | Maurin et al. |
| 2018/0046076 A1* | 2/2018 | Letko ..................... B33Y 70/00 |
| 2019/0224914 A1* | 7/2019 | Matzner ................. B33Y 10/00 |
| 2019/0315959 A1* | 10/2019 | Hazell .................... B33Y 70/00 |
| 2019/0352449 A1 | 11/2019 | Spyrou et al. |
| 2019/0352451 A1 | 11/2019 | Spyrou et al. |
| 2019/0352452 A1 | 11/2019 | Spyrou et al. |
| 2020/0165374 A1 | 5/2020 | Spyrou et al. |
| 2020/0172723 A1 | 6/2020 | Spyrou et al. |
| 2020/0190248 A1 | 6/2020 | Spyrou et al. |
| 2020/0277423 A1* | 9/2020 | Guichard .................. C08F 2/50 |
| 2020/0332046 A1* | 10/2020 | Abuelyaman .......... B33Y 30/00 |
| 2020/0362157 A1* | 11/2020 | Parkar .................... B33Y 80/00 |
| 2020/0385526 A1 | 12/2020 | Bakumov et al. |
| 2021/0032441 A1 | 2/2021 | Steyrer et al. |
| 2021/0108026 A1 | 4/2021 | Spyrou et al. |
| 2021/0206730 A1 | 7/2021 | Spyrou et al. |
| 2021/0229344 A1* | 7/2021 | Okamoto ............ C08F 222/104 |
| 2021/0380774 A1 | 12/2021 | Wagner et al. |
| 2022/0127386 A1* | 4/2022 | Watanabe ............. B29C 64/129 |
| 2022/0213245 A1* | 7/2022 | Snow ........................ C08F 2/48 |

FOREIGN PATENT DOCUMENTS

| | | |
|---|---|---|
| WO | 2010/115644 A1 | 10/2010 |
| WO | 2015/074088 A2 | 5/2015 |
| WO | 2015/075094 A1 | 5/2015 |
| WO | 2016/078838 A1 | 5/2016 |
| WO | 2018/087158 A1 | 5/2018 |
| WO | 2018/197677 A1 | 11/2018 |
| WO | 2019/213585 A1 | 11/2019 |
| WO | 2019/213588 A1 | 11/2019 |
| WO | 2021/175528 A1 | 9/2021 |

\* cited by examiner

COMPOSITION COMPRISING POLYESTERS FOR ADDITIVE MANUFACTURING

CROSS REFERENCE TO RELATED APPLICATIONS

This application is a 35 U.S.C. § 371 U.S. national phase entry of International Application No. PCT/EP2020/084655 having an international filing date of Dec. 4, 2020, which claims the benefit of European Application No. 19216942.3 filed Dec. 17, 2019, each of which is incorporated herein by reference in its entirety.

FIELD

The present invention relates to an additive manufacturing process using a composition comprising the reaction product of a polyester polyol and a compound comprising at least one functional group that can react with a hydroxyl-group of the polyester polyol and at least one further functional group, selected from acrylate- or methacrylate-group, wherein the polyester polyol is based on at least one organic acid comprising at least two carboxyl groups or its anhydride and at least one polyol comprising at least two hydroxy-groups, wherein the reaction product has a glass transition temperature Tg of below 23° C., and wherein the composition optionally further comprises a photoinitiator, as a photopolymerizable material.

BACKGROUND

Lithography-based additive manufacturing, such as stereolithography is—as well as 3D printing process in general—traditionally mainly used for the production of prototypes and functional patterns ("rapid prototyping"). As a result of technical advancements, real production applications are becoming increasingly important, such as transparent braces or hearing aid shells. For the application, the mechanical and thermal properties of the printing materials are of crucial importance. However, materials currently available for additive manufacturing do not yet have the mechanical properties of conventional manufacturing materials (see for example T. Swetly, J. Stampfl, G. Kempf and R.-M. Hucke, "Capabilities of Additive Manufacturing Technologies (AMT) in the Validation of the Automobile Cockpit", RTejournal—Forum for Rapid Technology 2014 (1)).

These materials (resins) for lithography-based additive manufacturing are based on reactive components that can be exposed and thus cured. For this purpose, radical (e.g. for acrylates) or cationic (e.g. for epoxides) polymerization is frequently used. For this purpose, special photoinitiators are added to the resin, which change their state by exposure and thus trigger the polymerization of the reactive components.

Various methods such as stereolithography, digital light processing and multi jet modelling are available for the additive manufacturing of objects from these resins. With all procedures these resins are hardened layer by layer and so a three-dimensional object is manufactured. As a rule, resins with low viscosity are required, e.g. 20-40 mPa·s (see I. Gibson, D. W. Rosen, B. Stucker et al., "Additive manufacturing technologies", vol. 238, Springer Verlag (2010)). In order to improve the mechanical properties, especially toughness and elongation at break, of products cured in this way, the crosslinking density must be reduced, or the molecular weight of the monomers increased. However, this increases the viscosity or the melting point of the uncured resins, which until recently could not be cured using additive manufacturing processes because of the latter.

However, new developments make it possible to process resins with higher viscosities. For example, WO 2015/075094 A1 and WO 2016/078838 A1 reveal stereo lithography devices in which the sequentially cured layers of polymerizable material can be heated, allowing even highly viscous resins to be processed. In WO 2015/074088 A2 photopolymerizable compositions with a viscosity of at least 20 Pa·s at room temperature are revealed, which are heated to at least 30° C. during curing. For comparison: 20 Pa·s correspond approximately to the viscosity of ethylene glycol or viscous honey, while butter with a viscosity of about 30 Pa·s is hardly flowable.

However, problems regarding the mechanical properties of hardened products, such as 3D printed parts, remain unsolved. For example, such products have insufficient impact strength and ductility, are too brittle and absorb too much water from the ambient air.

WO 2008/125202 A1 reveals through radiation and thermal cross-linking curable polyurethane systems and their use for the production of holographic media. The polyurethane compositions include A) polyisocyanates, B) polyols comprising at least one poly(ε-caprolactone)-polyester polyol, C) compounds with groups which react with ethylenically unsaturated compounds under polymerization under exposure to actinic radiation, D) radical stabilizers if necessary, and E) photoinitiators. The polycaprolactone polyols contained preferably have molecular weights of 500 to 2000 g/mol and serve as "building blocks of the matrix polymers", i.e. they polyadd with the polyisocyanates to give the desired polyurethanes.

WO 2018/197677 A1 describes improved light-curable compositions for additive manufacturing generative manufacturing processes. The photocurable composition having a viscosity of at least 20 Pa·s at 20° C. and comprises a photopolymerizable matrix material, at least one thermoplastic polymer dissolved therein, and at least one photoinitiator, wherein the polycaprolactone or a derivative thereof is used as the dissolved thermoplastic polymer.

WO 2019213585 A1 describes curable compositions for use in a high temperature lithography-based photopolymerization process, a method of producing crosslinked polymers using said curable compositions, crosslinked polymers thus produced, and orthodontic appliances comprising the crosslinked polymers. The curable compositions comprise so called toughness modifiers, preferably comprising (poly)carbonate and (poly)urethane groups.

WO2019213588 A1 describes curable compositions for use in a high temperature lithography-based photopolymerization process, a method of producing crosslinked polymers using said curable compositions, crosslinked polymers thus produced, and orthodontic appliances comprising the crosslinked polymers. The curable compositions comprise as novel polymerizable monomers, monomers based on a 2-, 3- or 4-(meth)acryloxybenzoic acid ester.

The problem to be solved by the present invention was to provide compositions that are photocurable and show good properties especially regarding tensile strength and elongation at break.

SUMMARY

It has been found that, surprisingly, this problem is solved by the compositions according to the claims.

Therefore, the objectives are achieved by the invention by providing an additive manufacturing process using a composition comprising the reaction product of a polyester polyol and a compound comprising at least one functional group that can react with a hydroxyl-group of the polyol and at least one further functional group, selected from acrylate- or methacrylate-group, wherein the polyester polyol is based on at least one organic acid comprising at least two carboxyl groups or its anhydride and at least one polyol comprising at least two hydroxy-groups, wherein the composition optionally further comprises a photoinitiator. as a photopolymerizable material.

DETAILED DESCRIPTION

The compositions used in the present invention have the advantage, that they can be processed at temperatures below 120° C., preferably at or below 100° C. This is because the viscosity of the composition at the processing temperature is preferably below 20 Pa·s.

The compositions used in the present invention have the advantage, that they preferably do not comprise any solvents. Therefore, no organic volatiles are produced during the additive manufacturing process.

The compositions used in the present invention have further the advantage, that they can be produced in a simple way.

The compositions used the present invention have the advantage, that they can comprise fillers, that lead to better characteristics, especially better tensile strength and elongation at break.

The compositions used in the present invention have the further advantage, that they comprise polymers (reaction products) having a low Tg and by using of this compositions elastomers or products having one or more properties typically for elastomers, e.g. an elongation at break of preferably more than 40%, more preferably more than 60% and most preferably more than 100%, are obtainable via added manufacturing.

The compositions, processes, and uses according to the invention are described by way of example hereinafter, without any intention that the invention be restricted to these illustrative embodiments. When ranges, general formulae or classes of compounds are specified below, these are intended to encompass not only the corresponding ranges or groups of compounds which are explicitly mentioned but also all subranges and subgroups of compounds which can be obtained by leaving out individual values (ranges) or compounds. Where documents are cited in the context of the present description, their content shall fully form part of the disclosure content of the present invention, particularly in respect of the matters referred to. Percentages specified hereinbelow are by weight unless otherwise stated. Where average values are reported hereinafter, these are the numerical average, unless stated otherwise. Where properties of a material are referred to hereinafter, for example viscosities or the like, these are the properties of the material at 25° C., unless stated otherwise. Where chemical (empirical) formulae are used in the present invention, the specified indices may be not only absolute numbers but also average values.

The additive manufacturing process of the invention us characterized in that is uses a composition comprising the reaction product of a polyester polyol and a compound comprising at least one functional group that can react with a hydroxyl-group of the polyester polyol and at least one further functional group, selected from acrylate- or methacrylate-group, wherein the polyester polyol is based on at least one organic acid comprising at least two carboxyl groups or its anhydride, preferably comprising from 4 to 44, more preferably comprising from 18 to 44, most preferably from 24 to 44 carbon atoms, and at least one polyol comprising at least two hydroxy-groups, wherein the reaction product has a Tg of below 23° C., preferably a Tg of from −60° C. to 0° C., more preferably a Tg of from −50° C. to −20° C. wherein the composition optionally further comprises a photoinitiator, as a photopolymerizable material.

Preferably the polyester polyol is based on a dicarboxylic acid, more preferably on an aliphatic dicarboxylic acid, and most preferably on a non-cyclic aliphatic dicarboxylic acid.

The polyester polyol of the present invention preferably does not comprise any carbonate groups, e.g. groups of formula —O—C(O)—O—. Most preferably the polyester polyol of the present invention preferably does not comprise any carbonate groups and is based on a dicarboxylic acid, more preferably on an aliphatic dicarboxylic acid, and most preferably on a non-cyclic aliphatic dicarboxylic acid.

The organic acid comprising at least two carboxyl groups, preferably two carboxyl groups, or its anhydride, is preferably a dimer fatty acid (also known as dimerized fatty acid or dimer acid). These dimer fatty acids are mixtures prepared by oligomerization of unsaturated fatty acids. Starting materials which can be used preferably include unsaturated $C_{12}$ to $C_{22}$ fatty acids. Depending on the number and position of the double bonds in the $C_{12}$ to $C_{22}$ fatty acids used for preparing the dimer fatty acids, the carboxyl groups of the dimer fatty acids are joined to one another by hydrocarbon radicals having predominantly 24 to 44 carbon atoms. These hydrocarbon radicals are commonly branched and may contain double bonds, $C_6$ cycloaliphatic hydrocarbon radicals or $C_6$ aromatic hydrocarbon radicals; these cycloaliphatic radicals and/or these aromatic radicals may also be fused. The radicals which join the carboxyl groups of the dimer fatty acids preferably have no aromatic hydrocarbon radicals, very preferably no unsaturated bonds and no aromatic hydrocarbon radicals.

Preferably the organic acid is a dimer acid of a fatty acid comprising from 12 to 22, preferably 16 to 20 carbon atoms and most preferably 18 carbon atoms. The present invention prefers the use of $C_{18}$ fatty acids for the production of dimer fatty acids. Particularly preferred is the use of $C_{18}$ fatty acids, and very preferably of linolenic, linoleic and/or oleic acid.

Depending on the reaction regime, the oligomerization referred to above may produce a mixture which comprises primarily dimeric molecules but also trimeric molecules and also monomeric molecules and other byproducts. Purification commonly can take place distillatively.

Commercial dimer fatty acids preferably contain at least 80 wt % of dimeric molecules, up to 19 wt % of trimeric molecules, and not more than 1 wt % of monomeric molecules and of other byproducts.

For the purposes of the present invention it is preferred that dimer fatty acids are used that consist of ≥90 wt % of dimeric molecules, ≤5 wt % of trimeric molecules, and ≤5 wt % of monomeric molecules and of other byproducts. Particular preference is given to the use of dimer fatty acids which consist of 95 to 98 wt % of dimeric molecules, less than 5 wt % of trimeric molecules, and less than 1 wt % of monomeric molecules and of other byproducts. Likewise particularly preferred is the use of dimer fatty acids which consist of ≥98 wt % of dimeric molecules, ≤1.5 wt % of trimeric molecules, and ≤0.5 wt % of monomeric molecules and of other byproducts.

Depending on reaction regime, dimer fatty acids contain both aliphatic and aromatic molecular fragments. The aliphatic molecular fragments can be divided further into linear and cyclic fragments, which in turn may be saturated or unsaturated. Through hydrogenation it is possible to convert the aromatic and the unsaturated aliphatic molecular fragments into corresponding saturated aliphatic molecular fragments.

Preferred dimer fatty acids that can be used in the present invention are for example Radiacid® 0970, Radiacid® 0971, Radiacid® 0972, Radiacid® 0975, Radiacid® 0976, and Radiacid® 0977 from Oleon, Pripol 1006, Pripol 1009, Pripol 1012, and Pripol 1013 from Unichema, Empol® 1008, Empol® 1061, and Empol® 1062 from BASF, and Unidyme® 10 and Unidyme® TI from Arizona Chemical.

Instead of using dimer fatty acids as organic acid comprising at least two carboxyl groups or its anhydride it might be advantageous to use aliphatic dicarboxylic acid comprising of from 4 to 10, preferably of from 6 to 8 carbon atoms. Most preferably hexanedioic acid (adipic acid) is used as aliphatic dicarboxylic acid The at least one polyol is preferably selected from the group consisting of octahydro-4,7-methano-1H-indendimethanol, methylpropanediol-1,3, monoethylene glycol, neopentyl glycol, and hexanediol-1,6.

It is especially preferred, if at least one of the at least one polyols is octahydro-4,7-methano-1H-indendimethanol and at least one of the at least one organic acids comprising at least two carboxyl groups is a dimeric acid of a fatty acid comprising from 18 carbon atoms or preferably adipic acid.

The polyester polyols present in the composition according to the invention can be obtained by esterification processes known in the art. Preferably the polyester polyols are obtained using a process as described as process step A of the process according to the invention later on.

The concentration of acid end groups in the polyester polyol, determined in accordance with DIN EN ISO 2114, is preferably between 0 and 10 mg KOH/g, but preferably below 2 mg KOH/g.

The number-average molecular weight of the polyester polyols used in accordance with the invention is preferably 1000 to 20000 g/mol, preferably 3000 to 10 000 g/mol. It is determined in accordance with DIN 55672-1 by means of gel permeation chromatography in tetrahydrofuran as eluent and polystyrene for calibration.

The compound comprising at least one functional group that can react with a hydroxyl-group of the polyester polyol and at least one further functional group, selected from acrylate- or methacrylate-group, is preferably an isocyanate compound comprising at least one (meth)acrylate group and at least one isocyanate group. More preferably the isocyanate compound is the reaction product of a diisocyanate and a compound comprising a hydroxyl-group and a (meth)acrylate-group, preferably the reaction product of hydroxyethyl methacrylate or hydroxyethyl acrylate and isophorone diisocyanate (IPDI), one or more trimethyl-1,6-hexane diisocyanates (TMDI), 4,4'-dicyclohexylmethanediisocyanate (H12MDI), or hexamethylenediisocyanate (HDI) most preferably the reaction product of hydroxyethyl methacrylate or hydroxyethyl acrylate and isophorone diisocyanate.

The isocyanate compound comprising at least one (meth)acrylate group and at least one isocyanate group can be prepared as described for example in WO 2010115644 A1 or WO 2019213585 A1.

The composition used according to the invention can include additional ingredients:

It might be advantageous to have one or more photoinitiators present in the composition of the present invention. A photoinitiator is preferably a molecule that creates reactive species e.g. free radicals, cations or anions when exposed to radiation (UV or visible). Any suitable photoinitiator, including type I and type II photoinitiators and including commonly used UV photoinitiators, examples of which include but are not limited to such as acetophenones (diethoxyacetophenone for example), phosphine oxides diphenyl(2,4,6-trimethylbenzoyl)phosphine oxide, phenyl bis(2,4,6-trimethylbenzoyl) phosphine oxide (PPO), Irgacure 369, etc. (See, e.g., U.S. Pat. No. 9,453,142 to Rolland et al.), can be present in the composition of the present invention. Preferred photoinitiators according to the invention are those, that create free radicals. Most preferred photoinitiator is bis(2,4,6-trimethylbenzoyl)-phenylphosphineoxide, which is available under the trade name OMNIRAD® 819 from IGM resins (formerly known as IRGACURE® 819 from BASF SE). Other photoinitiators that can be used in the composition of the present invention are available under the product names OMNIRAD® TPO and OMNIRAD® TPO-L from IGM resins. The amount of photoinitiator(s) present in the composition of the invention is preferably from 0.1 to 5% by weight, more preferably from 0.5 to 2% by weight, and most preferably 0.8 to 1.2% by weight based on the total composition.

The composition used according to the present invention can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 200 μm average diameter).

The particles can comprise an active agent or detectable compound, though these may also be provided dissolved/solubilized in the composition of the invention. For example, magnetic or paramagnetic particles or nanoparticles can be employed.

The composition used in the process of the present invention can have additional ingredients mixed or solubilized therein, including pigments, dyes, active compounds or pharmaceutical compounds, detectable compounds (e.g., fluorescent, phosphorescent, radioactive), etc., again depending upon the particular purpose of the product being fabricated.

It might be advantageous, if the composition used in the process of the present invention comprises one or more non-reactive pigments or dyes that absorbs light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or an organic ultraviolet light absorber such as a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

The composition used in the process according to the invention might comprise any suitable filler, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers.

The composition used in the process according to the invention preferably comprises one or more fillers, more preferably from 0.5 to 50 weight %, preferably 1 to 15 weight % based on the composition of a filler. The filler is preferably selected from inorganic particles, more preferably selected from carbon black and/or silica. Most preferably silica, functionalized with methacrylate groups, is present as filler in the composition according to the invention. Suitable silica, functionalized with methacrylate groups, is for example available from Evonik Industries AG (Evonik Resource Efficiency GmbH) under the trade names AEROSIL® 701 or 711.

It might be advantageous, if the composition used in the process of the present invention comprises a further compound comprising at least one methacrylate-group, wherein this compound does not comprise an isocyanate group or another functional group. The further compound can be used as reactive diluent and/or crosslinker. The compound is preferably present in an amount of from 5 to 95% by weight, more preferably 10 to 50% by weight, based on the total weight of the composition. Suitable compounds are for example those that are sold by Evonik Industries AG under the VISIOMER® product line. Preferred compounds are glycerol formal methacrylate (VISIOMER® Glyfoma), diurethane dimethacrylate (VISIOMER® HEMA TMDI), butyl diglycol methacrylate (VISIOMER® BDGMA), polyethyleneglycol 200 dimethacrylate (VISIOMER® PEG200DMA), trimethylolpropane methacrylate (VISIOMER® TMPTMA), or isobornyl methacrylate (VISIOMER® Terra IBOMA). The composition of the present invention comprises most preferably isobornyl methacrylate (VISIOMER® Terra IBOMA) as further compound comprising at least one methacrylate-group, wherein this compound does not comprise an isocyanate group or another functional group, preferably in an amount of from 10 to 50% by weight, based on the total weight of the composition.

The composition used in the process according to the invention preferably comprises a polymerization inhibitor and/or antioxidant. By using a polymerization inhibitor and/or antioxidant the polymerization of the composition before using it in the additive manufacturing process can be prevented. Suitable polymerization inhibitors are for example 2,6-di-tert-butyl-4-methylphenol, catechol, 4-methoxyphenol, 4-tert-butyloxyphenol, 4-benzyloxyphenol, naphthol, phenothiazine, 10-10-dimethyl-9,10-dihydroacridine, bis-[2-hydroxy-5-methyl-3-cyclohexylphenyl]-methane, bis-[2-hydroxy-5-methyl-3-tert-butylphenyl]-methane, hydrochinon, pyrogallol, 3,4-dihydroxy-1-tert-butylbenzol, 4-methoxy-2(3)-tert-butylphenol (BHA), BHA also in combination with bis-[2-carboxyethyl]-sulfide (TDPA), 4-methyl-2,6-di-tert-butylphenol (BHT), bis-[4-hydroxy-2-methyl-5-tert.-butylphenyl]-sulfide, 4-butylmercaptomethyl-2,6-di-tert-butylphenol, 4-hydroxy-3,5-di-tert-butylphenylmethane sulfonic acid-dioctadecylester, 2,5-dihydroxy-1-tert-butylbenzene, 2,5-dihydroxy-1,4-di-tert.-butylbenzene, 3,4-dihydroxy-1-tert.-butylbenzene and 2,3-dimethyl-1,4-bis-[3,4-dihydroxyphenyl]-butane, 2,2'-thiobis-(4-tert-octylphenol), TEMPO, also TEMPO-derivates like e.g. 4-hydroxy-TEMPO. A preferred polymerization inhibitor is 2,6-di-tert-butyl-4-methylphenol (BHT), which is sold under the trade name IONOL® CP, by Oxiris Chemicals S.A. The amount of polymerization inhibitor present in the composition of the invention is preferably from 0.001 to 1% by weight, more preferably from 0.01 to 0.5% by weight based on the total composition.

The composition used in the process according to the present invention might be obtained by any suitable process. Preferably the compositions according to the invention is obtained by the process of the invention as described below.

The process for preparing a composition according to the invention comprises at least two reaction steps (and a mixing step C), A Preparing a polyester polyol by reacting at least one organic acid comprising at least two carboxyl groups or its anhydride, preferably comprising from 18 to 44, more preferably from 24 to 44 carbon atoms, and at least one polyol comprising at least two hydroxy-groups, B Reacting the polyester polyol of step A with at least one compound comprising at least one functional group that can react with a hydroxyl-group of the polyol and at least one further functional group, selected from acrylate- or methacrylate-group, preferable an isocyanate compound to obtain a reaction product having a Tg of below 23° C., preferably a Tg of from −60° C. to 0° C., more preferably a Tg of from −50° C. to −20° C. and C Optionally mixing the reaction product of step B with a photoinitiator.

Process step A is preferably conducted as a melt condensation. For this purpose, the afore mentioned monomers are preferably initially charged and melted in an equivalent ratio of hydroxyl to carboxyl groups of 0.5 to 1.5, preferably 1.0 to 1.3. The polycondensation preferably takes place in the melt preferably at temperatures from 150 to 280° C. preferably over the course of 3 to 30 hours.

It may be advantageous if a majority of the amount of water released is initially distilled off at standard pressure. In the further course, the remaining water of reaction and volatile diols are preferably eliminated, until the target molecular weight is achieved. Optionally this may be made easier through reduced pressure, through an enlargement in the surface area, or by the passing of an inert gas stream through the reaction mixture.

The esterification can additionally be accelerated by addition of an azeotrope former and/or of a catalyst, before or during the reaction. Examples of suitable azeotrope formers are toluene and xylenes. Preferred catalysts are organotitanium or organotin compounds such as tetrabutyl titanate or dibutyltin oxide and catalysts based on other metals such as zinc or antimony, and also metal-free esterification catalysts.

Furthermore, it may be advantageous to add further additives and processing auxiliaries, such as antioxidants or color stabilizers, to the esterification mixture.

The polyesters obtained in the esterification preferably have at least one hydroxyl and/or carboxyl end group; the functionality is preferably 1.0 to 4.0, particularly preferably 1.5 to 3.0.

Process step B is preferably conducted in the presence of a suitable catalyst. Suitable catalysts are for example organo tin compounds, preferably dibutyl tin dilaurate (DBTL). Process step B might be conducted with or without a solvent.

Preferably process step B is conducted in the presence of a solvent. A suitable solvent is for example acetone. Most preferable acetone is used as a solvent in step B.

It might be advantageous to conduct process step B in the presence of an antioxidant/polymerization inhibitor. Preferably the inhibitor is added to the reaction mixture together with the at least one compound comprising at least one functional group that can react with a hydroxyl-group of the polyol and at least one further functional group, selected from acrylate- or methacrylate-group.

If a solvent was used in process step B, the solvent is preferably removed after the completion of the reaction, preferably under vacuum.

Process step C can be conducted in a usual manner. Preferably the mixing is done at room temperature using a conventional mixing device. A suitable mixing device is for example SpeedMixer machine. The mixing is done for a period and with a speed that leads to a homogeneous composition. Preferably the mixing is done for a period of from 1 to 60 minutes, preferably 10 to 20 minutes at a speed of from 500 to 5000 rpm, preferably 1200 to 2300 rpm. If filler(s) and/or reactive diluent(s) should be added to the composition, those components can be introduced together with the photoinitiator.

The composition used in the process according to the invention can be used as a photopolymerizable material in an additive manufacturing process, preferably in a 3D printing process using stereolithography. The composition used in the process according to the invention can especially be applied as raw material in additive manufacturing processes as described in WO 2015/075094 A1 or WO 2016/078838 A1. An object of the invention is therefore a method comprising an additive manufacturing process, preferably an additive manufacturing processes as described in WO 2015/075094 A1 or WO 2016/078838 A1, wherein the composition of the present invention is applied as raw material.

In general, the additive manufacturing process and especially the 3D process is based on the following technology: a photopolymerizable material is processed layer-by-layer to generate a shaped body. In the process a newly supplied photopolymerizable material layer is in each case polymerized with the desired contour, wherein by successively for each layer defining its individual contour the desired body is formed in its three-dimensional shape which is resulting from the succession of the layers made.

Even without further elaboration it is believed that a person skilled in the art will be able to make the widest use of the above description. The preferred embodiments and examples are therefore to be interpreted merely as a descriptive disclosure which is by no means limiting in any way whatsoever.

The subject matter of the present invention is elucidated in detail in the following examples, without any intention that the subject matter of the present invention be restricted to these.

EXAMPLES

1. Test Methods a) Determination of Acid Number:
The concentration of acid end groups is determined in accordance with DIN EN ISO 2114 by titrimetric means in mg KOH/g of polymer.
b) Determination of OH Number (OHN):
The concentration of the OH groups is determined in accordance with DIN 53240-2 by titrimetric means in mg KOH/g of polymer.
c) Determination of NCO Number (NCON):
The NCO number was determined in accordance with DIN EN 1242 by titrimetric means in % by weight.
d) Determination of Viscosity:
The viscosity of the polyesters produced and of the reaction products of polyester and diisocyanate was determined in accordance with DIN EN ISO 3219 in Pa·s using a rotational viscometer at the temperature specified in each case.
e) Determination of Glass Transition Temperature Tg:
The thermal properties of the polyesters used in the context of the present invention are determined by differential scanning calorimetry (DSC) in accordance with the DSC method DIN 53765. The values of the second heating interval are stated, and the heating rate was 10 K/min.
f) Determination of Molecular Weight:
The number-average molecular weight of the polyesters according to the invention is determined in accordance with DIN 55672-1 by means of gel permeation chromatography in tetrahydrofuran as eluent and polystyrene for calibration.

2. Raw Materials Used

| Chemical name | Abbreviation | Trade name | Producer |
| --- | --- | --- | --- |
| Diacidic C18 fatty acid dimer | DFAD | PRIPOL ® 1012 | Croda |
| Octahydro-4,7-methano-1H-indendimethanol | TCD-alcohol | | Oxea |
| Methylpropanediol-1,3 | | | Sigma-Aldrich |
| Monoethylene glycol | | | Sigma-Aldrich |
| Neopentyl glycol | | | Sigma-Aldrich |
| Hexanediol-1,6 | | | Sigma-Aldrich |
| Trimethylolpropane | | | Sigma-Aldrich |
| Diisocyanate end-capped with hydroxyethyl methacrylate | IPDI - HEMA | | Evonik Industries AG |
| Diisocyanate end-capped with hydroxyethyl acrylate | IPDI - HEA | | Evonik Industries AG |
| Dibutyltin dilaurate | DBTL | | Sigma-Aldrich |
| 2,6-Di-tert-butyl-4-methylphenol | | IONOL ® CP | Oxiris Chemicals S.A. |
| Organic alkoxy titanate | OGT | TYZER ® OGT | Dorf Ketal |
| Acetone | | | Sigma-Aldrich |
| Adipic acid | | | Sigma-Aldrich |
| Phthalic anhydride | | | Sigma-Aldrich |

| Chemical name | Abbreviation | Trade name | Producer |
| --- | --- | --- | --- |
| Glycerol formal methacrylate | GLYFOMA | VISIOMER® Glyfoma | Evonik Industries AG |
| Trimethylcyclohexyl methacrylate | TMCHMA | VISIOMER® TMCHMA | Evonik Industries AG |
| Diurethane dimethacrylate | | VISIOMER® HEMA TMDI | Evonik Industries AG |
| Butyl diglycol methacrylate | BDGMA | VISIOMER® BDGMA | Evonik Industries AG |
| Polyethylenglycol 200 dimethacrylate | PEG200DMA | VISIOMER® PEG200DMA | Evonik Industries AG |
| Trimethylolpropane methacrylate | TMPTMA | VISIOMER® TMPTMA | Evonik Industries AG |
| Isobornylmethacrylate | IBOMA | VISIOMER® Terra IBOMA | Evonik Industries AG |
| Isobornylacrylate | IBOA | VISIOMER® Terra IBOA | Evonik Industries AG |
| Dimethyl 2,6-naphthalenedicarboxylate | DM-NDC | | Sigma-Aldrich |
| Bis(2,4,6-trimethylbenzoyl)-phenylphosphineoxide | I819 | IRGACURE® 819 | BASF SE |
| Fumed silica aftertreated with methacrylsilane | A709 | AEROSIL® 709 | Evonik Industries AG |
| Fumed silica aftertreated with methacrylsilane | A711 | AEROSIL® 711 | Evonik Industries AG |

IPDI-HEMA was synthesized as described in WO 2019213585 A1 by mixing 260 g of 2-hydroxyethyl methacrylate (M=130.14 g/mol, 2 mol) and 445 g of isophorone diisocyanate (M=222.3 g/mol, 2 mol) at 40° C. for 2 h.

IPDI-HEA was synthesized according to the method described in WO 2019213585 A1 by mixing 232 g of 2-hydroxyethyl acrylate (M=116.12 g/mol, 2 mol) and 445 g of isophorone diisocyanate (M=222.3 g/mol, 2 mol) at 40° C. for 2 h.

3. Synthetic Method for Producing the Polyesters (Step A)

a.) Polyester PE1

DFAD (3347 g, 5.8 mol), TCD-alcohol (325 g 1.7 mol), methylpropanediol-1,3 (597 g, 6.6 mol) and 0.8 g OGT were filled in a nitrogen stream into a 6 L reaction flask with column and distillation top and heated. When a temperature of 165° C. is reached, water began to distil off. The temperature was increased to 230° C. within one hour. After about another hour at this temperature, water separation slows down. The column and the distillation top were removed and replaced by a distillation bridge. The process was continued under vacuum, which was adjusted during the reaction so that distillate was still produced. After reaching the desired hydroxyl and acid number range, the process was stopped. The characteristics of polyester PE1 are given in table 1.

b.) Polyester PE2

DFAD (3387 g, 6.0 mol), TCD-alcohol (272 g 1.4 mol), methylpropanediol-1,3 (499 g, 5.5 mol) and 0.8 g OGT were filled in a nitrogen stream into a 6 L reaction flask with column and distillation top and heated. When a temperature of 165° C. is reached, water began to distil off. The temperature was increased to 230° C. within one hour. After about another one and a half hour at this temperature, water separation slows down. The column and the distillation top were removed and replaced by a distillation bridge. The process was continued under vacuum, which was adjusted during the reaction so that distillate was still produced. After reaching the desired hydroxyl and acid number range, the process was stopped. The characteristics of polyester PE2 are given in table 1.

c.) Polyester PE3

DFAD (3504 g, 6.1 mol), TCD-alcohol (341 g 1.7 mol), methylpropanediol-1,3 (626 g, 7.0 mol) and 0.8 g OGT were filled in a nitrogen stream into a 6 L reaction flask with column and distillation top and heated. When a temperature of 165° C. is reached, water began to distil off. The temperature was increased to 230° C. within one hour. After about another one and a half hour at this temperature, water separation slows down. The column and the distillation top were removed and replaced by a distillation bridge. The process was continued under vacuum, which was adjusted during the reaction so that distillate was still produced. After reaching the desired hydroxyl and acid number range, the process was stopped. The characteristics of polyester PE3 are given in table 1.

d.) Polyester PE4

DFAD (3275 g, 5.7 mol), phthalic anhydride (210 g, 1.4 mol), hexanediol-1,6 (210 g, 1.8 mol), methylpropanediol-1,3 (640 g, 7.1 mol) and 0.8 g OGT were filled in a nitrogen stream into a 6 L reaction flask with column and distillation top and heated. When a temperature of 170° C. is reached, water began to distil off. The temperature was increased to 230° C. within one hour. After about another hour at this temperature, water separation slows down. The column and the distillation top were removed and replaced by a distillation bridge. The process was continued under vacuum, which was adjusted during the reaction so that distillate was still produced. After reaching the desired hydroxyl and acid number ranges, the process was stopped. The characteristics of polyester PE4 are given in table 1.

e.) Polyester PE5

DFAD (3176 g, 5.5 mol), phthalic anhydride (203 g, 1.4 mol), TCD-alcohol (340 g, 1.7 mol), methylpropanediol-1,3 (625 g, 6.9 mol) and 0.8 g OGT were filled in a nitrogen stream into a 6 L reaction flask with column and distillation top and heated. When a temperature of 165° C. is reached, water began to distil off. The temperature was increased to 230° C. within one hour. After about another one and a half hour at this temperature, water separation slows down. The column and the distillation top were removed and replaced by a distillation bridge. The process was continued under vacuum, which was adjusted during the reaction so that distillate was still produced. After reaching the desired hydroxyl and acid number ranges, the process was stopped. The characteristics of polyester PE5 are given in table 1.

f.) Polyester PE6

DFAD (3301 g, 5.7 mol), TCD-alcohol (237 g, 1.2 mol), methylpropanediol-1,3 (435 g, 4.8 mol), trimethylolpropane (270 g, 2.0 mol), and 0.8 g OGT were filled in a nitrogen stream into a 6 L reaction flask with column and distillation top and heated. When a temperature of 165° C. is reached, water began to distil off. The temperature was increased to 230° C. within one hour. After about another hour at this temperature, water separation slows down. The column and the distillation top were removed and replaced by a distillation bridge. The process was continued under vacuum, which was adjusted during the reaction so that distillate was still produced. After reaching the desired hydroxyl and acid number ranges, the process was stopped. The characteristics of polyester PE6 are given in table 1.

g.) Polyester PE7

Adipic acid (3349 g, 22.9 mol), monoethylene glycol (778 g, 12.5 mol), neopentyl glycol (2878 g, 14.7 mol), and 0.8 g OGT were filled in a nitrogen stream into a 6 L reaction flask with column and distillation top and heated. When a temperature of 154° C. was reached, water began to distil off. The temperature was increased to 240° C. within one hour. After about two further hours at this temperature, water separation slowed down. The column and the distillation top were removed and replaced by a distillation bridge. The process was continued under vacuum, which was adjusted during the reaction so that distillate was still produced. After reaching the desired hydroxyl and acid number ranges, the process was stopped. The characteristics of polyester PE7 are given in table 1.

h.) Polyester PE8

DFAD (3434 g, 5.9 mol), TCD-alcohol (289 g, 1.5 mol), methylpropanediol-1,3 (531 g, 5.9 mol) and 0.8 g OGT were filled in a nitrogen stream into a 6 L reaction flask with column and distillation top and heated. When a temperature of 165° C. is reached, water began to distil off. The temperature was increased to 230° C. within one hour. After about another hour at this temperature, water separation slows down. The column and the distillation top were removed and replaced by a distillation bridge. The process was continued under vacuum, which was adjusted during the reaction so that distillate was still produced. After reaching the desired hydroxyl and acid number ranges, the process was stopped. The characteristics of polyester PE8 are given in table 1.

4. Reaction With IPDI-HE(M)A (Step B)

a.) PEMA1

428.9 g of the polyester PE1 and 0.21 g of DBTL catalyst were filled in an air stream into a 2 L reaction flask equipped with a stirrer, a temperature sensor, and a reflux condenser and solved in 286.1 g acetone. The mixture was heated to 45° C. and a solution of 167.9 g IPDI-HEMA and 3.0 g IONOL® CP in 113.9 g acetone was added dropwise via a dropping funnel within a period of 45 minutes. Afterwards the temperature was risen to 60° C. and kept there for a period of 8 hours. The reaction mixture was cooled to room temperature and stirred for another 18 hours. After reaching the desired NCO-value of <0.5% (on solids) the process was stopped. The solvent acetone was removed under vacuum at a temperature of 40° C. for 100 hours. The characteristics of the reaction products are given in table 2.

b.) PEMA2

537.0 g of the polyester PE2 and 0.27 g of DBTL catalyst were filled in an air stream into a 2 L reaction flask equipped with a stirrer, a temperature sensor, and a reflux condenser and solved in 359.2 g acetone. The mixture was heated to 45° C. and a solution of 59.75 g IPDI-HEMA and 3.0 g IONOL® CP in 41.8 g acetone was added dropwise via a dropping funnel within a period of 15 minutes. Afterwards the temperature was risen to 60° C. and kept there for a period of 5 hours. The reaction mixture was cooled to room temperature and stirred for another 16 hours. After reaching the desired NCO-value of <0.5% (on solids) the process was stopped. The solvent acetone was removed under vacuum at a temperature of 40° C. for 100 hours. The characteristics of the reaction products are given in table 2.

c.) PEMA3

562.7 g of the polyester PE3 and 0.28 g of DBTL catalyst were filled in an air stream into a 2 L reaction flask equipped with a stirrer, a temperature sensor, and a reflux condenser and solved in 563.0 g acetone. The mixture was heated to 45° C. and a solution of 34.0 g IPDI-HEMA and 3.0 g IONOL® CP in 37.0 g acetone was added dropwise via a dropping funnel within a period of 15 minutes. Afterwards the temperature was risen to 60° C. and kept there for a period of 4 hours. The reaction mixture was cooled to room temperature and stirred for another 18 hours. After reaching the desired NCO-value of <0.5% (on solids) the process was stopped. The solvent acetone was removed under vacuum at a temperature of 40° C. for 100 hours. The characteristics of the reaction products are given in table 2.

d.) PEMA4

463.5 g of the polyester PE4 and 0.23 g of DBTL catalyst were filled in an air stream into a 2 L reaction flask equipped

TABLE 1

Characteristics of the polyesters obtained in examples 3a.) to 3h.) (step A)

| Example | Mn [g/mol] | Mw [g/mol] | Tg [° C.] | OHZ [mg KOH/g] | SZ [mg KOH/g] | [Viscosity [Pa*s] at 80° C. |
|---------|-----------|-----------|-----------|----------------|---------------|-----------------------------|
| 3a.)    | 3300      | 7000      | −55       | 57             | 0.4           | 1                           |
| 3b.)    | 7500      | 20100     | −51       | 16.2           | 0.4           | 10                          |
| 3c.)    | 9800      | 28200     | −50       | 8.8            | 0.3           | 31                          |
| 3d.)    | 6000      | 15700     | −53       | 20             | 0.5           | 4                           |
| 3e.)    | 5500      | 16400     | −46       | 18.3           | 0.3           | 7                           |
| 3f.)    | 3300      | 8900      | −50       | 80             | 0.7           | 1                           |
| 3g.)    | 5300      | 14300     | −47       | 24             | 0.4           | 3                           |
| 3h.)    | 4800      | 11100     | −56       | 31             | 0.5           | n.d.                        | n.d.: not determined with a stirrer, a temperature sensor, and a reflux condenser and solved in 309.0 g acetone. The mixture was heated to 45° C. and a solution of 63.7 g IPDI-HEMA and 2.7 g IONOL® CP in 42.5 g acetone was added dropwise via a dropping funnel within a period of 30 minutes. Afterwards the temperature was risen to 60° C. and kept there for a period of 5 hours. The reaction mixture was cooled to room temperature and stirred for another 15 hours. After reaching the desired NCO-value of <0.5% (on solids) the process was stopped. The solvent acetone was removed under vacuum at a temperature of 40° C. for 100 hours. The characteristics of the reaction products are given in table 2.

e.) PEMA5

459.4 g of the polyester PE5 and 0.23 g of DBTL catalyst were filled in an air stream into a 2 L reaction flask equipped with a stirrer, a temperature sensor, and a reflux condenser and solved in 306.0 g acetone. The mixture was heated to 45° C. and a solution of 57.7 g IPDI-HEMA and 2.6 g IONOL® CP in 38.5 g acetone was added dropwise via a dropping funnel within a period of 30 minutes. Afterwards the temperature was risen to 60° C. and kept there for a period of 4 hours. The reaction mixture was cooled to room temperature and stirred for another 17 h. After reaching the desired NCO-value of <0.5% (on solids) the process was stopped. The solvent acetone was removed under vacuum at a temperature of 40° C. for 110 hours. The characteristics of the reaction products are given in table 2.

f) PEMA6

392.0 g of the polyester PE6 and 0.20 g of DBTL catalyst were filled in an air stream into a 2 L reaction flask equipped with a stirrer, a temperature sensor, and a reflux condenser and solved in 261.3 g acetone. The mixture was heated to 45° C. and a solution of 207.8 g IPDI-HEMA in 138.5 g acetone was added dropwise via a dropping funnel within a period of 20 minutes. Afterwards the temperature was risen to 60° C. and kept there for a period of 6 hours. The reaction mixture was cooled to room temperature and stirred for another 64 h. After reaching the desired NCO-value of <0.5% (on solids) the process was stopped. The solvent acetone was removed under vacuum at a temperature of 40° C. for 96 hours. The characteristics of the reaction products are given in table 2.

g) PEMA7

862.4 g of the polyester P7 and 0.5 g of DBTL catalyst were filled in an air stream into a 2 L reaction flask equipped with a stirrer, a temperature sensor, and a reflux condenser and solved in 574.9 g acetone. The mixture was heated to 45° C. and a solution of 137.1 g IPDI-HEMA in 91.4 g acetone was added dropwise via a dropping funnel within a period of 45 minutes. Afterwards the temperature was risen to 60° C. and kept there for a period of 15 hours. After reaching the desired NCO-value of <0.5% (on solids) the process was stopped. The solvent acetone was removed under vacuum at a temperature of 40° C. for 205 hours. The characteristics of the reaction products are given in table 2.

h) PEMA8

492.0 g of the polyester PE8 and 0.25 g of DBTL catalyst were filled in an air stream into a 2 L reaction flask equipped with a stirrer, a temperature sensor, and a reflux condenser and solved in 328.0 g acetone. The mixture was heated to 45° C. and a solution of 104.8 g IPDI-HEMA and 3.0 g IONOL® CP in 69.9 g acetone was added dropwise via a dropping funnel within a period of 40 minutes. Afterwards the temperature was risen to 60° C. and kept there for a period of 8 hours. The reaction mixture was cooled to room temperature and stirred for another 17 h. After reaching the desired NCO-value of <0.5% (on solids) the process was stopped. The solvent acetone was removed under vacuum at a temperature of 40° C. for 100 hours. The characteristics of the reaction products are given in table 2.

i) PEA1

430.0 g of the polyester PE1 and 0.21 g of DBTL catalyst were filled in an air stream into a 2 L reaction flask equipped with a stirrer, a temperature sensor, and a reflux condenser and solved in 286.7 g acetone. The mixture was heated to 45° C. and a solution of 163.8 g IPDI-HEA and 6.0 g IONOL® CP in 109.2 g acetone was added dropwise via a dropping funnel within a period of 45 minutes. Afterwards the temperature was risen to 60° C. and kept there for a period of 12 hours. The reaction mixture was cooled to room temperature and stirred for another 30 h. After reaching the desired NCO-value of <0.5% (on solids) the process was stopped. The solvent acetone was removed under vacuum at a temperature of 40° C. for 160 hours. The characteristics of the reaction products are given in table 2.

TABLE 2

Characteristics of the reaction products obtained in examples 4a.) to 4i.) (step B)

| Example | Tg [° C.] | Viscosity [Pa*s] at 80° C. |
|---|---|---|
| 4a.) | −41 | 7 |
| 4b.) | −49 | 19 |
| 4c.) | −48 | 52 |
| 4d.) | −51 | 5 |
| 4e.) | −47 | 20 |
| 4f.) | −30 | 12 |
| 4g.) | −41 | 7 |
| 4h.) | −46 | 6 |
| 4i.) | −40 | 3 | n.d.: not determined

5.) Resin Preparation (Step C)

A formulation comprising a reaction product according to one of the examples 4a.) to 4i.), a photoinitiator (Irgacure® 819), optionally at least one reactive diluent (VISIOMER® product line), and optionally fillers (AEROSIL® product line) was prepared by mixing the different components in a SpeedMixer machine (10 to 20 min at 1200 to 2300 rpm) until a homogenous resin is obtained. The composition of the different formulations is given in table 3.

TABLE 3a

Composition of the resin formulation prepared in example 5 in parts by weight (given in parenthesis)

| | Reaction product | Photoinitiator | Diluent | Filler |
|---|---|---|---|---|
| 5a | 4a (99) | I819 (1) | — | — |
| 5b | 4a (99, 5) | 1819 (0.5) | — | — |
| 5c | 4a (98) | I819 (2) | — | — |
| 5d | 4h (98) | I819 (2) | — | — |
| 5e | 4h (99) | I819 (1) | — | — |
| 5f | 4f (98) | I819 (2) | — | — |
| 5g | 4f (99) | I819 (1) | — | — |
| 5h | 4c (98) | I819 (2) | — | — |
| 5i | 4c (99) | I819 (1) | — | — |
| 5j | 4b (90) | I819 (1) | IBOMA (10) | — |
| 5k | 4b (70) | I819 (1) | IBOMA (30) | — |
| 5l | 4b (50) | I819 (1) | IBOMA (50) | — |
| 5m | 4b (70) | I819 (1) | IBOMA/ TMPTMA (25)/(5) | — |

TABLE 3a-continued

Composition of the resin formulation prepared in example 5 in parts by weight (given in parenthesis)

| | Reaction product | Photoinitiator | Diluent | Filler |
|---|---|---|---|---|
| 5n | 4b (90) | I819 (1) | GLYFOMA (10) | — |
| 5o | 4b (70) | I819 (1) | GLYFOMA (30) | — |
| 5p | 4b (90) | I819 (1) | TMCHMA (10) | — |
| 5q | 4b (70) | I819 (1) | TMCHMA (30) | — |

TABLE 3b

Composition of the resin formulation prepared in example 5 in parts by weight (given in parenthesis)

| | Reaction product | Photoinitiator | Diluent | Filler |
|---|---|---|---|---|
| 5r | 4b (70) | I819 (1) | IBOMA/PEG200DMA (20)/(10) | — |
| 5s | 4b (70) | I819 (1) | IBOMA/BDGMA (20)/(10) | — |
| 5t | 4d (70) | I819 (1) | TMCHMA (30) | — |
| 5u | 4e (70) | I819 (1) | TMCHMA (30) | — |
| 5v | 4g (70) | I819 (1) | IBOMA (30) | — |
| 5w | 4i (90) | I819 (1) | IBOA (10) | — |
| 5x | 4i (70) | I819 (1) | IBOA (30) | — |
| 5y | 4c (70) | I819 (1) | IBOMA (30) | — |
| 5z | 4b (70) | I819 (1) | IBOMA (29) | A711 (1) |
| 5aa | 4b (70) | I819 (1) | IBOMA (27) | A711 (3) |
| 5ab | 4b (70) | I819 (1) | IBOMA (21) | A709 (9) |
| 5ac | 4b (70) | I819 (1) | IBOMA (27) | A709 (11) |
| 5ad | 4c (62) | I819 (1) | IBOMA (27) | A709 (11) |
| 5ae | 4c (66) | I819 (1) | IBOMA (28) | A709 (5) |

6.) 3D Printing

The resin was then printed on a Hot Lithography (SLA) machine (Cubicure Caligma200). The temperature was adjusted depending on the viscosity of the resin. A viscosity of ca. 20 Pa·s at printing temperature was targeted. This typically led to a printing temperature in the range of from 30 to 100° C. The layers were 100 μm thick. At the end of the print jobs, the objects were detached from the building platform. The parameters used are given in table 4.

The typical post-processing required to wash the printed objects with pure isopropanol in a Formlab wash-station for 1 h. Afterwards, the printed objects were placed in a Formlab cure-station, where they were irradiated with blue (405 nm) light while being heated at 80° C. for 2 h. Finally, the printed objects were tested following the norms DIN EN ISO 527 (tensile testing). The results are also summarized in table 4a and 4b.

TABLE 4a

Parameters used for printing and results of the testing of the printed objects

| Resin Formulation | Printing temperature (° C.) | Tensile strength (MPa) | Elongation @break (%) | Tg (° C.) |
|---|---|---|---|---|
| 5a | 70 | 8 | 44 | n.d. |
| 5b | 70 | 8 | 67 | −36 |
| 5c | 70 | 6 | 42 | n.d. |
| 5d | 70 | 2 | 44 | n.d. |
| 5e | 70 | 2 | 61 | −42 |
| 5f | 70 | 15 | 49 | n.d. |
| 5g | 70 | 15 | 44 | −26 |
| 5h | 100 | 1.4 | 124 | n.d. |
| 5i | 100 | 1.9 | 133 | −44 |
| 5j | 70 | 1.5 | 84 | −42 |
| 5k | 70 | 4 | 188 | −36 |
| 5l | 30 | 11 | 150 (6) | −34 |
| 5m | 70 | 15 | 105 | −39 |
| 5n | 70 | 2 | 97 | −44 |
| 5o | 60 | 5 | 75 | −45 |
| 5p | 60 | 1 | 105 | −43 |
| 5q | 50 | 2 | 203 | −35 |

Elongation@Break (value given in parenthesis: yield point), n.d.: not determined

TABLE 4b

Parameters used for printing and results of the testing of the printed objects

| Resin Formulation | Printing temperature (° C.) | Tensile strength (MPa) | Elongation @break (%) | Tg (° C.) |
|---|---|---|---|---|
| 5r | 60 | 6 | 95 | n.d. |
| 5s | 60 | 1.6 | 173 | n.d. |
| 5t | 30 | 3 | 200 | n.d. |
| 5u | 50 | 3 | 200 | n.d. |
| 5v | 70 | 8 | 100 | n.d. |
| 5w | 60 | 7 | 88 | n.d. |
| 5x | 50 | 10 | 110 | n.d. |
| 5y | 80 | 7 | 222 | −36 |
| 5z | 80 | 5.2 | 196 | −36 |
| 5aa | 70 | 6 | 178 | −37 |
| 5ab | 80 | 6 | 165 | −38 |
| 5ac | 60 | 9 | 180 | n.d. |
| 5ad | 80 | 14 | 217 | n.d. |
| 5ae | 80 | 10 | 174 | n.d. |

Elongation@Break, n.d.: not determined

It can be seen from the examples that the highest elongation at break (>200%) are reached with good tensile strength (7 MPa) for the highest Mn polymer (PEMA3). Tensile strength can be gained at the expense of elongation by adding crosslinkers/diluents. Tackiness increases with increasing Mw.

Silica, especially fumed silica after treated with a methacrylsilane, can improve tensile strength without significantly affecting the values for elongation at break.

The invention claimed is:

1. A method for producing a three-dimensional object with an additive manufacturing process, the method comprising:
   reacting at least one organic acid and at least one polyol, forming a polyester polyol,
      wherein the organic acid comprises:
         at least two carboxyl groups, or anhydrides thereof, and
         4 to 44 carbons, and
      wherein the polyol comprises at least two hydroxyl groups;
   reacting the polyester polyol with at least one compound comprising an acrylate or methacrylate, forming a polymer reaction product,
      wherein the polymer reaction product has a glass transition temperature (Tg) of below 23° C.;
   mixing the polymer reaction product, a photoinitiator, and a diluent to generate a composition, wherein the diluent comprises at least one methacrylate-group and the diluent does not comprise an isocyanate group; and
   generating the three-dimensional object using the composition in the additive manufacturing process.

2. The method according to claim 1, wherein the at least one organic acid is a dimeric acid of a fatty acid comprising from 12 to 22 carbon atoms or adipic acid.

3. The method according to claim 1, wherein the at least one compound comprising an acrylate or methylacrylate further comprises an isocyanate group.

4. The method according claim 1, wherein the at least one compound is the reaction product of a diisocyanate and a compound comprising: (i) a hydroxyl-group and a acrylate-group or (ii) a hydroxyl-group and a methyacrylate.

5. The method according to claim 1, wherein the at least one polyol is selected from the group consisting of octahydro-4, 7-methano-1H-indendimethanol, methylpropanediol-1, 3, monoethylene glycol, neopentyl glycol, and hexanediol-1, 6.

6. The method according to claim 1, wherein the at least one polyol is octahydro-4, 7-methano-1Hindendimethanol and the at least one organic acid is adipic acid or a dimeric acid of a fatty acid comprising from 18 carbon atoms.

7. The method according to claim 1, wherein the composition further comprises a filler.

8. The method according to claim 7, wherein the filler is selected from inorganic particles functionalized with methacrylate groups.

9. The method according to claim 1, wherein the at least one compound comprising an acrylate or methacrylate is present in an amount of from 5 to 95% by weight, based on the total weight of the polymer reaction product.

10. The method according to claim 1, wherein the reaction product has a Tg of from −60° C. to 0° C.

11. The method according to claim 1, wherein the additive manufacturing process is a 3D printing process using light, stereolithography, digital light processing, or irradiation with LCD.

12. The method according to claim 1, wherein the polyester polyol is based on at least one organic acid comprising at least two carboxyl groups, or anhydrides thereof, and 18 to 44 carbon atoms.

13. The method according to claim 1, wherein the polyester polyol is based on at least one organic acid comprising at least two carboxyl groups, or anhydrides thereof, and 24 to 44 carbon atoms.

14. The method according to claim 1, wherein the organic acid is a dimeric acid of a fatty acid comprising from 16 to 20 carbon atoms.

15. The method according to claim 1, wherein the organic acid is a dimeric acid of a fatty acid comprising 18 carbon atoms.

16. The method according to claim 1, wherein the at least one compound comprising an acrylate or methacrylate is the reaction product of hydroxyethyl methacrylate or hydroxy ethyl methacrylate and isophorone diisocyanate.

17. The method according to claim 7, wherein the composition comprises from 0.5 to 50 weight % of a filler.

18. The method according to claim 8, wherein the inorganic particles are selected from carbon black and silica.

19. The method of claim 1, wherein the diluent is selected from glycerol formal methacrylate, trimethylcyclohexyl methacrylate, butyl diglycol methacrylate, polyethylenglycol 200 dimethacrylate, trimethylolpropane methacrylate, isobornylmethacrylate, or isobornyacrylate.

* * * * *